(12) United States Patent
Keast et al.

(10) Patent No.: US 12,089,758 B2
(45) Date of Patent: Sep. 17, 2024

(54) CUPHOLDER ASSEMBLY

(71) Applicant: Precise Flight, Inc., Bend, OR (US)

(72) Inventors: Brian Michael Keast, Sisters, OR (US); Adam B Robirts, Bend, OR (US); Tyler Sam Tuttle, Redmond, OR (US); Douglas Peter LaPlaca, Austin, TX (US)

(73) Assignee: Precise Flight, Inc., Bend, OR (US)

( * ) Notice: Subject to any disclaimer, the term of this patent is extended or adjusted under 35 U.S.C. 154(b) by 0 days.

(21) Appl. No.: 17/314,725

(22) Filed: May 7, 2021

(65) Prior Publication Data

US 2021/0345805 A1    Nov. 11, 2021

Related U.S. Application Data

(60) Provisional application No. 63/021,308, filed on May 7, 2020.

(51) Int. Cl.
*A47G 23/02* (2006.01)
*B60N 3/10* (2006.01)
*B64D 11/00* (2006.01)

(52) U.S. Cl.
CPC ......... *A47G 23/0216* (2013.01); *B60N 3/103* (2013.01); *B64D 11/00* (2013.01)

(58) Field of Classification Search
CPC ............ A47G 23/0216; A47G 19/2272; A47G 29/087; A47G 19/2261; A47G 29/093; B60N 3/103; B60N 3/102; B60N 3/106; B60N 3/10; B60N 3/107; B64D 11/00; B64D 11/0638; A45C 2200/20; B62B 5/00; Y10S 224/926; Y10S 24/53; F16B 21/04; B60R 11/00; B65D 51/24

USPC ............ 248/311.2, 284.1, 314, 346.11, 685, 248/309.1, 316.2, 346.04; 220/737, 300, 220/298, 293; 224/282, 553, 926; 211/85

See application file for complete search history.

(56) References Cited

U.S. PATENT DOCUMENTS

| | | | |
|---|---|---|---|
| 3,233,858 A * | 2/1966 | Benjamin | B60N 3/102 248/311.2 |
| 5,529,201 A | 6/1996 | Tallent et al. | |
| 6,145,715 A | 11/2000 | Slonim | |
| 6,511,031 B2 | 1/2003 | Lin | |
| 6,520,368 B1 * | 2/2003 | Chiu | A47J 41/00 220/630 |
| 8,191,844 B2 * | 6/2012 | Pennino | B62J 11/04 248/220.21 |

(Continued)

FOREIGN PATENT DOCUMENTS

| CN | 105996687 A | 10/2016 |
|---|---|---|
| CN | 209870204 U * | 12/2019 |

(Continued)

OTHER PUBLICATIONS

U.S. Receiving Office, International Search Report and Written Opinion for PCT Application No. PCT/US23/78515, dated Feb. 6, 2024, 9 pages.

*Primary Examiner* — Don M Anderson
*Assistant Examiner* — John Martin Hoppmann
(74) *Attorney, Agent, or Firm* — Chernoff Vilhauer, McClung & Stenzel LLP

(57) ABSTRACT

A selectively engageable and interlocking cupholder assembly, which may be used an aircraft or vehicle interior while in movement.

4 Claims, 6 Drawing Sheets

AMENDED

(56) References Cited

U.S. PATENT DOCUMENTS

| | | | |
|---|---|---|---|
| 8,757,418 B2 * | 6/2014 | Zimmerman | A47G 29/093 |
| | | | 248/205.8 |
| 9,241,554 B1 * | 1/2016 | Tong | A45C 13/00 |
| 10,596,946 B1 | 5/2020 | Huntley et al. | |
| 2014/0117031 A1 * | 5/2014 | Zimmerman | A47G 7/06 |
| | | | 220/737 |

FOREIGN PATENT DOCUMENTS

| | | | | |
|---|---|---|---|---|
| CN | 211710692 U | * | 10/2020 | |
| GB | 2241872 A | * | 9/1991 | B60N 3/102 |

* cited by examiner

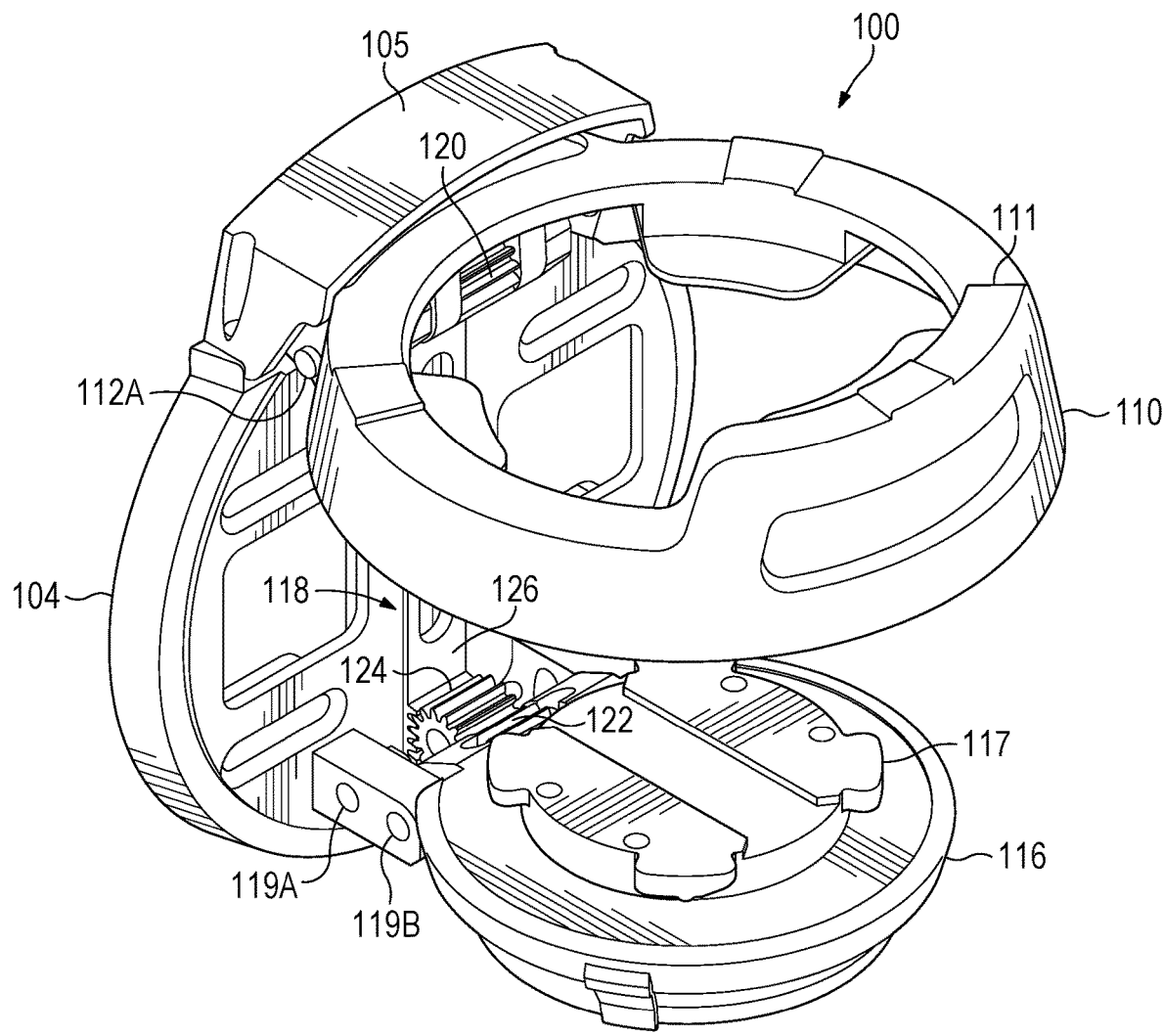
AMENDED FIG. 1

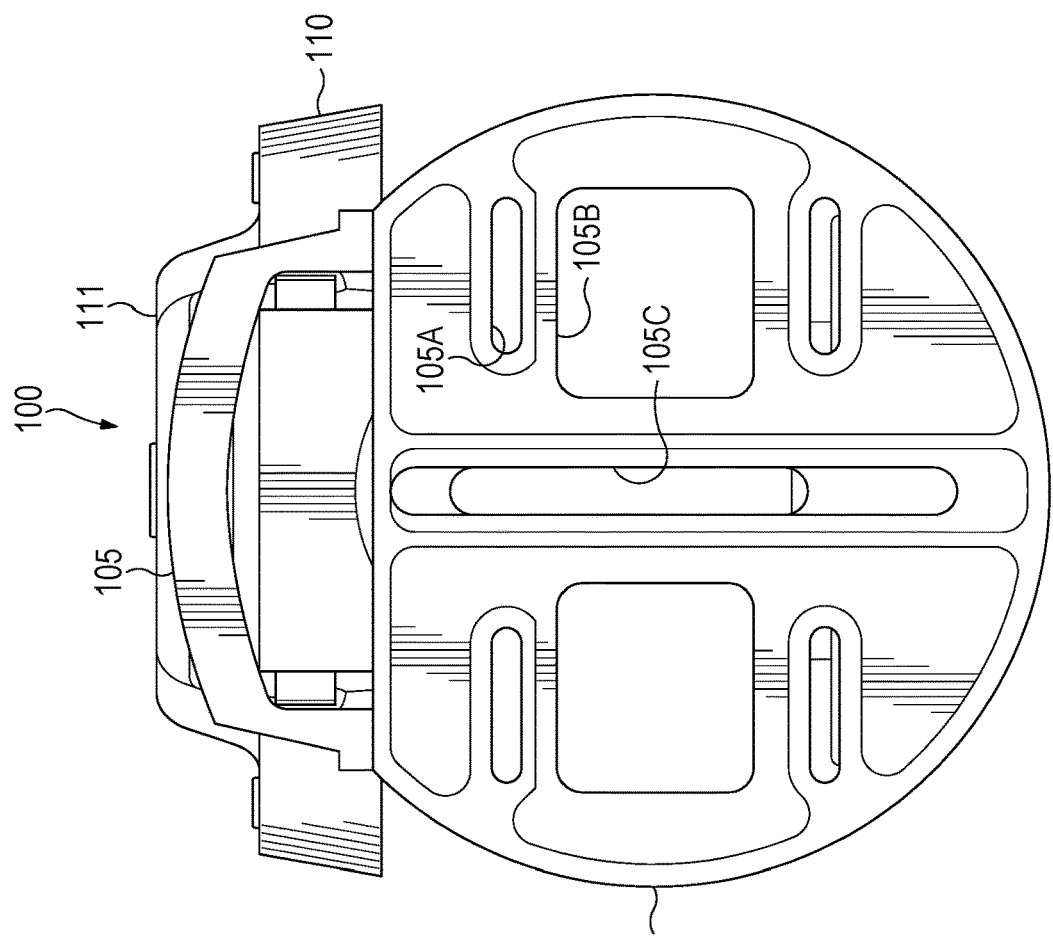
FIG. 3
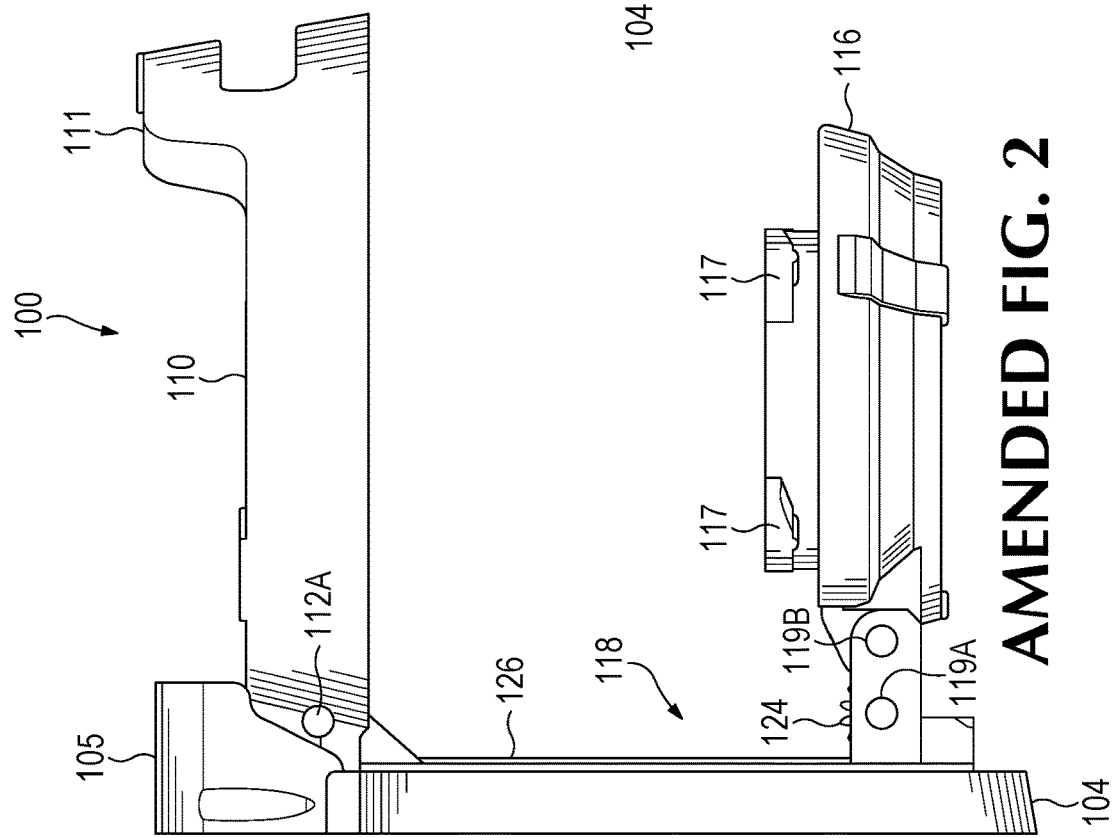
AMENDED FIG. 2

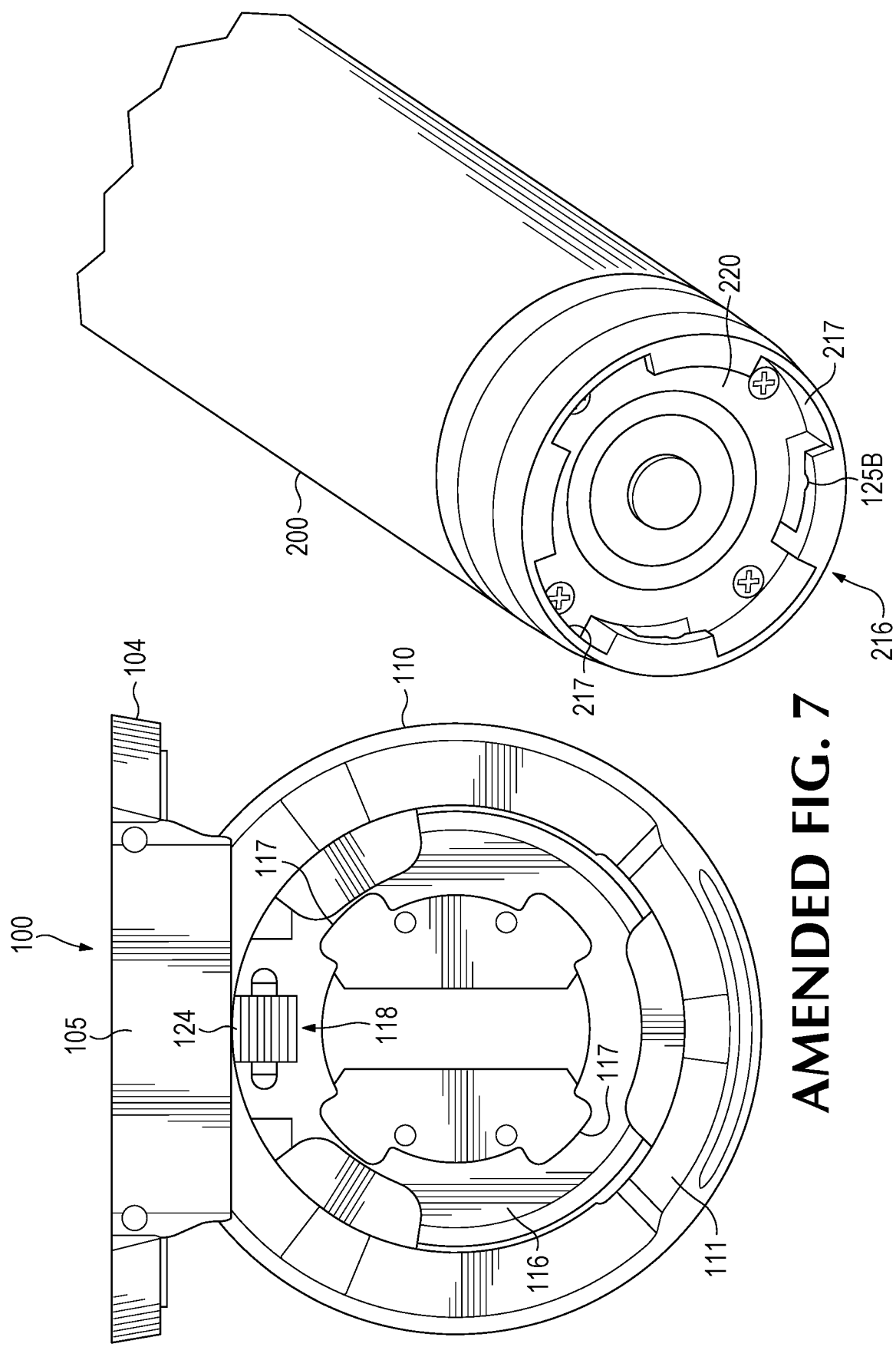
AMENDED FIG. 7

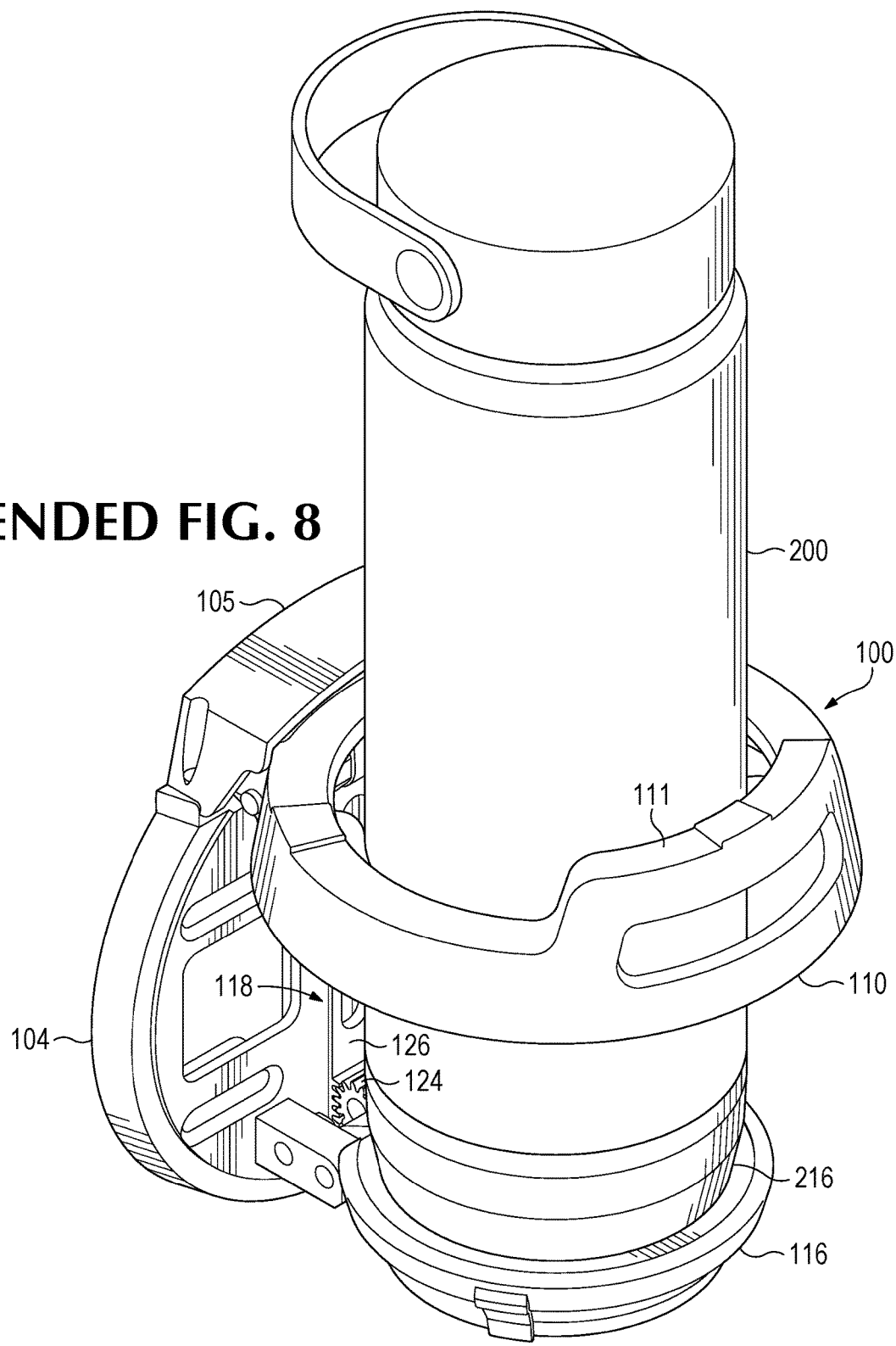
AMENDED FIG. 8

CUPHOLDER ASSEMBLY

CROSS REFERENCE TO RELATED APPLICATIONS

This application claims benefit of U.S. Provisional Application No. 63/021,308, filed May 7, 2020, the entire disclosure of which is hereby incorporated herein by reference for all purposes.

BACKGROUND OF THE INVENTION

None.

SUMMARY OF THE INVENTION

The present disclosure is directed to a selectively engageable cupholder assembly, which may be used an aircraft or vehicle interior while in movement.

In the aviation industry, passengers and pilots may opt to drink beverages and liquids while in flight. Oftentimes, turbulence may occur, resulting in drink spillage. Loose drinkware in the cockpits of airplanes, helicopters, and other vehicles cause spillage, leading to accidents and impeding operation of the aircraft/vehicle. It is especially dangerous when the drinkware slips behind the pedals of the aircraft resulting in accidents and impeded operation of the aircraft/vehicle.

Additionally, spilled beverages in cockpits and other vehicles cause millions of dollars of damage to aircraft. Spills may be hard to remove and cause great inconvenience to flight personnel, especially if the spillage occurs in the cockpit. Finally, given the increase in aircraft sales and travel, there exists a need for solutions for the modern aircraft cabin.

What is desired, therefore, is a cupholder system or assembly that will be suitable in preventing beverage-related accidents in an operating aircraft, or any type of moving vehicle.

BRIEF DESCRIPTION OF THE DRAWINGS

For a better understanding of the disclosure, and to show how the same may be carried into effect, reference will now be made, by way of example to the accompanying drawings, which:

FIG. 1 shows a perspective view of an exemplary embodiment of the present disclosure;

FIG. 2 shows a side view of the assembly of FIG. 1;

FIG. 3 shows a rear view of the assembly of FIG. 1;

FIG. 7 shows an alternative embodiment of the cupholder assembly; and

FIG. 8 shows perspective view of the cupholder assembly of FIG. 7.

DETAILED DESCRIPTION OF PREFERRED EMBODIMENTS

Figure 4:
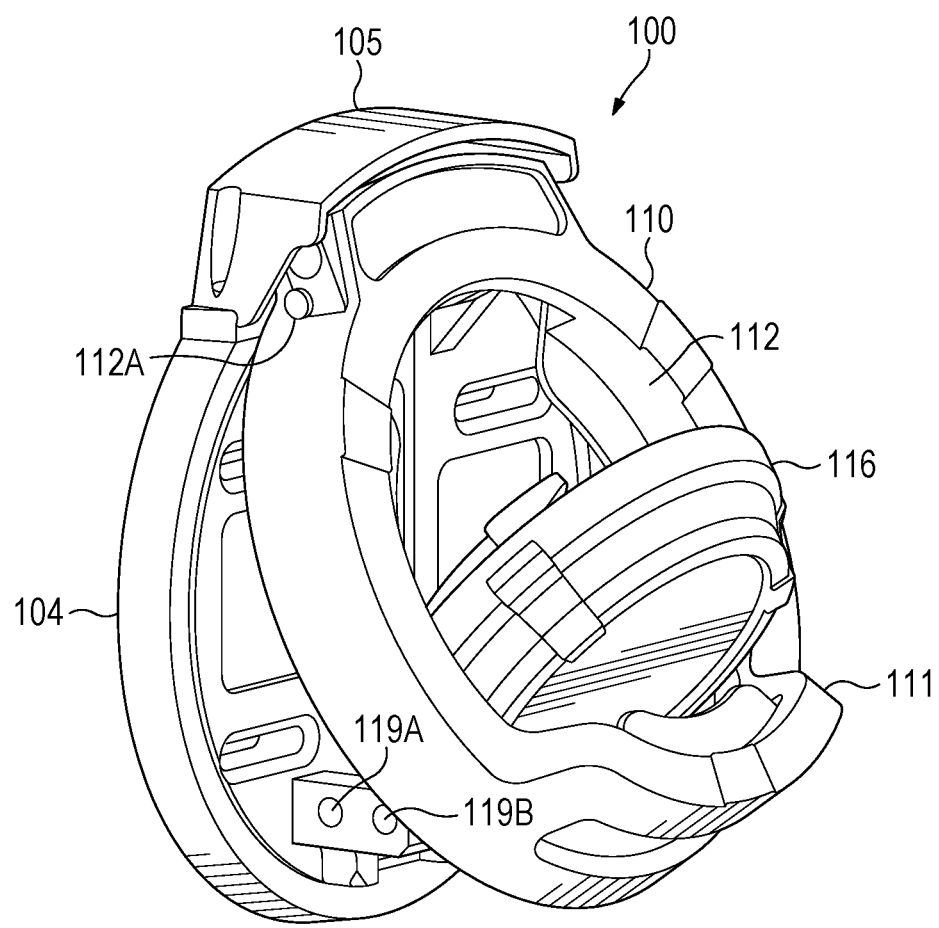
FIG. 4 shows a perspective view of the assembly of FIG. 1 when partially engaged.

Referring to FIGS. 1-6, an illustrative example of a cupholder assembly 100 is shown, which can be used to hold beverages and bottled liquids in an aircraft. In some embodiments, the assembly 100 includes a generally circular top member 110, a generally circular bottom member 116, and a generally circular main member 104. As shown in FIG. 1, both the top 110 and bottom member 116 may be pivotably attached to the main member 104, so that the top and bottom member may be generally perpendicular to the main member when in use to hold beverages or liquid containers. As shown in FIG. 2, in a preferred embodiment, the top and bottom member may be attached to the main member with a rack and pinion 118 mechanism, and/or threaded members, pins (112A, 112B, 119A, 119B), or other equivalent components.

In this mechanism, the rack and pinion 118 system consists of several components working in tandem. Firstly, a driving gear 120 molded into the top member 110. This gear 120, in embodiments, functions as the driving force for the rack and pinion 118 system. Secondly, a rack 126, a portion of the rack and pinion 118 system, which meshes with the driving gear 120 to translate rotational motion into linear motion. As the top member 110 is pushed or pulled, it drives the driving gear 120 molded into it, which in turn engages with the rack 126, causing it to move linearly. Additionally, an idler gear 124 is situated between the rack 126 and the bottom member driven gear 122. The idler gear 124 ensures smooth and efficient transfer of rotational motion from the rack to the bottom member driven gear 122, enabling synchronized movement between the top 110 and bottom 116 members.

When the top member 110 is either pulled up or pushed down, the rack and pinion 118 system orchestrates the movement of the cupholder assembly 100 components. As the user applies force to the top member 110, the driving gear 120, molded into its structure and serving as the primary driver of the system 118, engages with the rack 126 on one end, initiating linear motion. The rack 126, meshing with the driving gear 120, converts the rotational motion of the gear 120 into linear movement, causing the rack 126 to move. Simultaneously, the idler gear 124, located on the opposite end of the rack 126, ensures seamless transfer of motion from the rack 126 to the bottom member driven gear 122. The bottom member driven gear 122, which in embodiments is molded into the bottom member 116, simultaneously moves the bottom member 116. Consequently, the coordinated action of these components facilitates synchronized movement between the top 110 and bottom 116 members, allowing for effortless adjustment, positioning, and opening and closing of the cupholder assembly 100 to accommodate beverage containers.

As shown in FIGS. 2 and 3, the generally circular main member 104 may have an upward extended portion 105 at the top of the member. As shown in FIG. 2, the top member 110 may have a ridge 111 extending generally in an upward direction, when the top member is generally perpendicular in placement to the main member 104. As shown in FIG. 3, the main member 104 may have recesses 105A, 105B, 105C made along the surface to allow threaded members and other materials to pass through when the assembly 100 is being installed to the aircraft or vehicle. The members may be made from high quality and durable but lightweight materials, such as metal, in particular, aluminum. The members should also be hardy enough to hold when construction components like threaded members are engaged with the members and passing through.

Referring to FIGS. 2 and 4 to 6, the assembly 100 may be selectively engaged so that the top 110 and bottom member 116 may pivotably fold into the main member 104. In the preferred embodiment, the members may engage through a rack and pinion 118 mechanical design, accompanied with corresponding pins 112A, 112B, 119A, 119B, threaded members or other equivalents to aid in attachment of the members. In doing so, the top 110 and bottom member 116 may have dimensions corresponding to the main member so that when the top and bottom members are fully engaged or folded into the main member, the two may fold neatly over each other in a face-to-face abutment.

Figure 5:
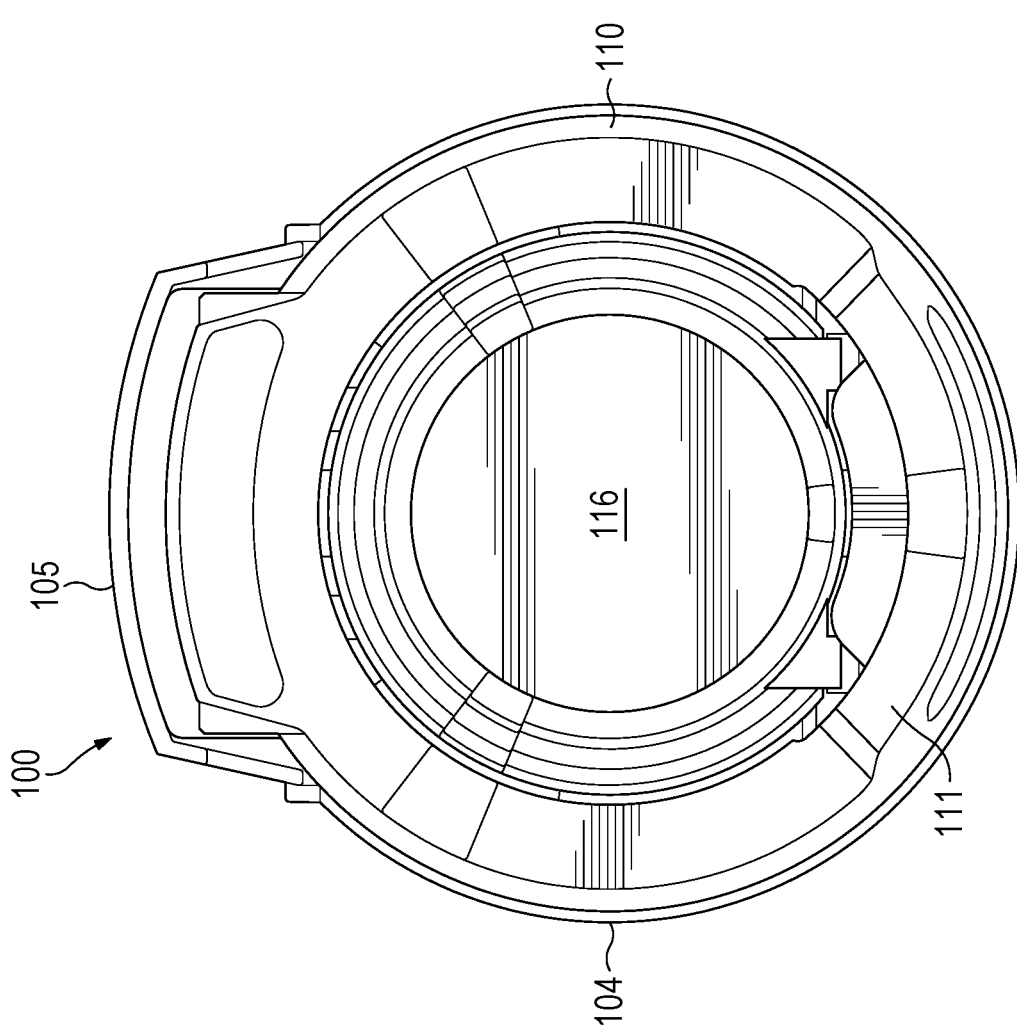
FIG. 5 shows a perspective view of the assembly of FIG. 1 when fully engaged.

As shown in FIGS. 4 and 5, the top member 110 may have a circular opening 112 that generally conforms to the dimensions of the bottom member 116. When the assembly 100 is selectively engaged, the opening 112 may allow for the entirety of the bottom member 116, excluding the portion pivotably attached to the main member, to pass or slide through the top member 110, until the top member 110 is in ultimate face-to-face abutment with the bottom member 116. Because aircraft cupholder breakage is often caused by the user stepping on the cupholder by accident, allowing the three members to pivotably engage and fold into a unitary mass allows for increased structural strength and further prevents the members from breaking upon unwanted impact.

Figure 6:
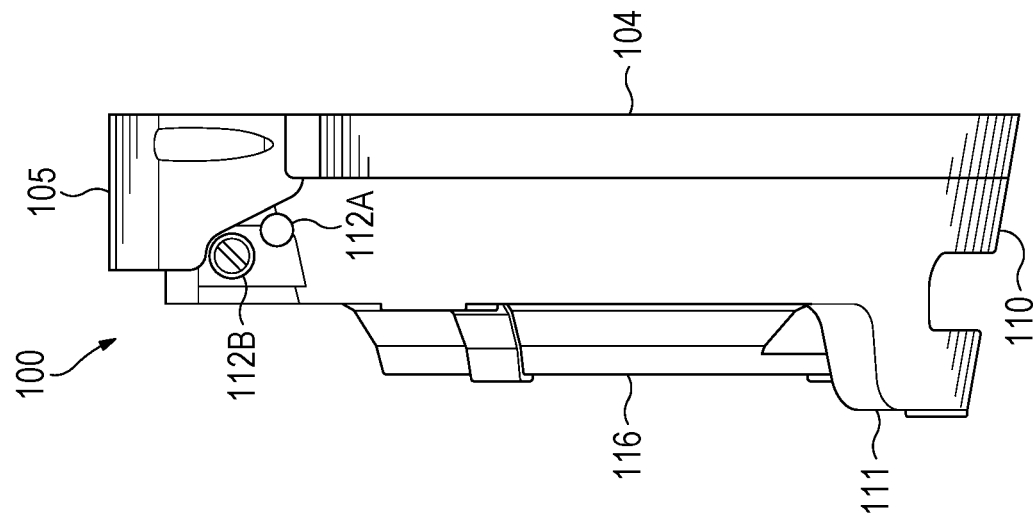
FIG. 6 a side view of the assembly of FIG. 1 when fully engaged.

As shown in FIGS. 1 and 6, when the top member 110 is fully engaged and folded into a face-to-face abutment with the other members, the top member 110 may have an extended ridge 111 that adheres generally to the dimensions of the bottom member 116 and envelops the bottom member 116. Doing so aids in the support and stability of the bottom member 116. As shown in FIGS. 2 and 6, when the top member is fully engaged with the main member 104, the main member 104 may have an upward extended portion 105 that adheres generally to the dimensions of the top member 110 and envelops the top member 110. Having these features aid in the support and stability of the bottom 116 and top member 110. Further, as shown in FIG. 3, because the dimensions of the extended portion 105 are slightly larger and envelope the connection points where the top member is connected to the main member, the extended portion 105 may protect the rack and pinion system and its corresponding pins attaching the top and main member from external impact.

The assembly 100 may be easily integrated into the aircraft's existing beverage console design, allowing for minimal design work and maximum safety of beverages and drinkware. The assembly may also be available as an interior mounted module, so that it may be installed on the interior wall of the aircraft cabin. This option would allow for easy access to beverages by the user, while offering little obtrusion into aircraft cabin space while the assembly is fully engaged.

Referring to FIGS. 7 and 8, an alternative example of the cupholder assembly is shown, where the cupholder 100 may be used together with a water bottle 200. In the preferred embodiment, to aid in the secure assembly when positioning the beverage or water bottle 200 on top of the bottom member 116, the bottom member 116 may have generally circular teeth 117 extending upwards from the member surface, where the teeth largely fit into corresponding circular apertures 217 of the same dimensions at the bottom 216 of the water bottle. The bottom 216 of the water bottle may have multiple receiving cut outs 217 or recesses to receive the teeth of the bottom member, to hold the water bottle in place, so that the bottle may interlock to the cupholder assembly and create a safe, secure connection between the drinkware and the cupholder. In a preferred embodiment, a user may engage or disengage the water bottle with a quarter turn. Because of the additional corresponding grooves to the teeth of the bottom member, the connection will remain stable and secure and will not disengage, even in significant turbulence in flight. Aside from the water bottle 200, the cupholder 100 may also be compatible with all standard and commonly used drinkware.

It will be appreciated that the disclosure is not restricted to the particular embodiment that has been described, and that variations may be made therein without departing from the scope of the disclosure as defined in the appending claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

What is claimed is:

1. A cupholder assembly for holding beverages and their respective containers, said assembly comprising:
    (a) a main member defining a circular shape and defining one or more main member recesses;
    (b) a bottom member defining a circular shape, said bottom member being pivotably attached to the main member, wherein said bottom member defines one or more teeth extending upwards when the bottom is placed generally perpendicular to said main member;
    (c) a top member defining a circular shape, said top member being pivotably attached to the main member, the top member defining a circular opening where dimensions of the opening generally conform to the dimensions of the bottom member, so that the entirety of the bottom member excluding the pivotably attached portion may pass through the opening, when the top member is in face-to-face abutment with the bottom member, wherein said top member includes a ridge extending generally in an upward direction when said top member is generally perpendicular in placement to said main member;
    (d) a beverage bottle defining a cylindrical shape capable of being engaged to the bottom member with a quarter turn, wherein the bottom of said beverage bottle defines corresponding recesses to receive said one or more teeth;
    (e) a tongue-and-groove mechanism, wherein a tongue is located on each of said one or more teeth and a groove is located in each of said one or more recesses; and
    (f) a rack and pinion mechanism, wherein said main member, said bottom member, and said top member engage with one another through said rack and pinion mechanism.

2. The assembly of claim 1, wherein the bottle may interlock to the bottom member through radially engaging the teeth with the corresponding recesses.

3. The assembly of claim 1, wherein the circumference of the bottle is slightly smaller than that of the circular opening in the top member, when the bottle is placed generally parallel to the main member.

4. The assembly of claim 3, wherein the assembly is composed at least in part of metal.

\* \* \* \* \*